Oct. 7, 1958
I. A. SMITH
2,854,867
METHOD OF MAKING HEADER DIES
Original Filed April 29, 1953
2 Sheets-Sheet 1
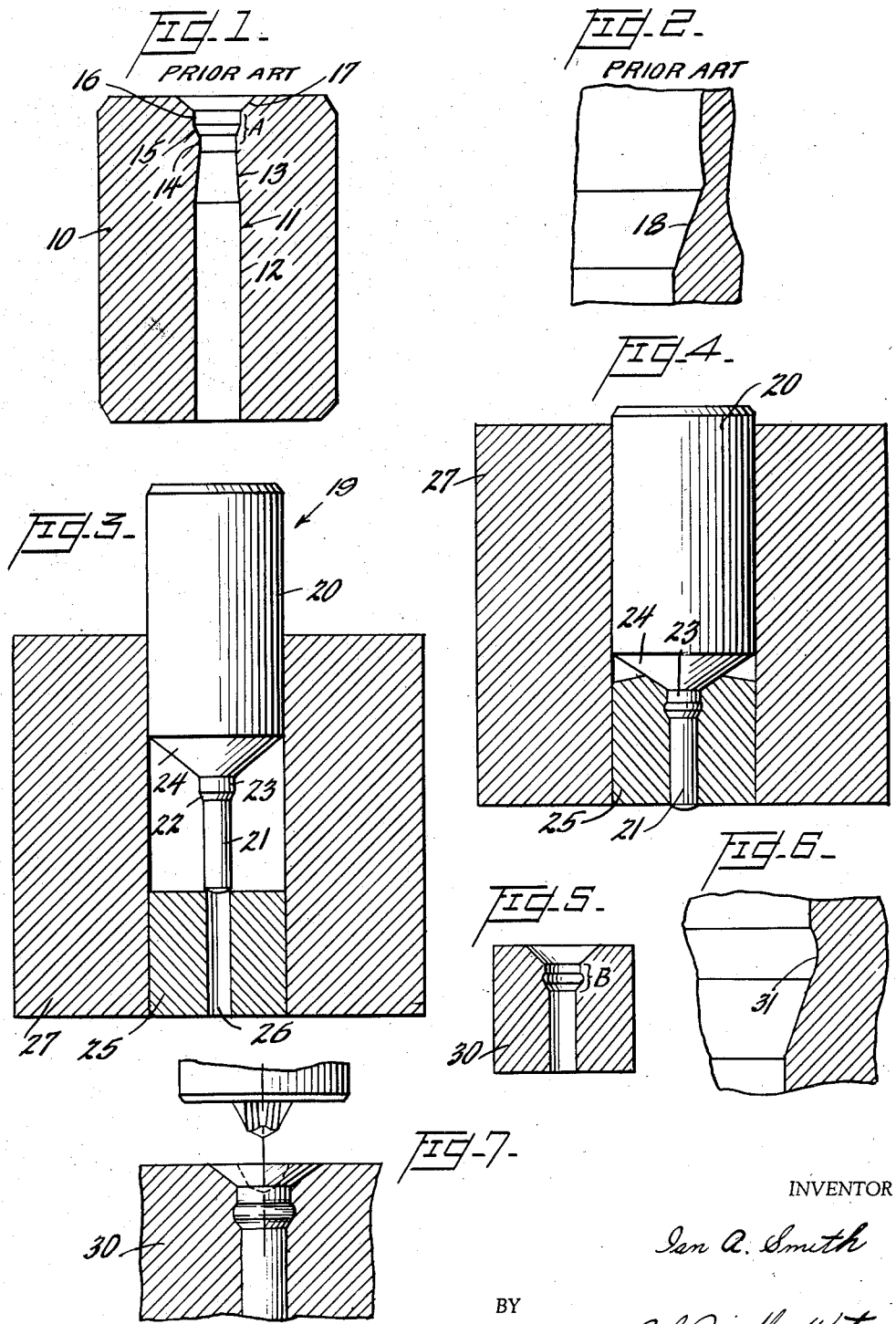
INVENTOR
Ian A. Smith
BY
Watson, Cole, Grindle & Watson
ATTORNEYS Oct. 7, 1958     I. A. SMITH     2,854,867

METHOD OF MAKING HEADER DIES

Original Filed April 29, 1953     2 Sheets-Sheet 2

INVENTOR

Ian A. Smith

BY Watson, Cole, Grindle & Watson
ATTORNEYS

United States Patent Office 2,854,867
Patented Oct. 7, 1958

2,854,867

METHOD OF MAKING HEADER DIES

Ian A. Smith, Willimantic, Conn., assignor to American Screw Company, Willimantic, Conn., a corporation of Rhode Island Original application April 29, 1953, Serial No. 351,902. Divided and this application March 7, 1955, Serial No. 492,664

6 Claims. (Cl. 76—107)

The present invention relates to methods of making header dies for cold heading machines, particularly relating to dies for use in the heading of screws and the like. This application is a division of my co-pending application filed April 29, 1953, Serial No. 351,902.

Threaded fasteners provided with heads, such as the conventional wood screws, machine screws, etc., whether of the slotted head variety or of the "Phillips" head type, are produced in the form of an unthreaded headed blank which is then provided with threads by a thread rolling or thread cutting step. Conventionally, the blanks are produced by the cold heading method in which short lengths are severed from a coil of suitable wire stock, transferred to the header die, and subjected to one or more sharp blows whereby the metal of one end of the short length of wire is upset to form the required head. In manufacturing screws of the "Phillips" type, the headed blank is then subjected to a second blow, delivered by another punch which is suitably shaped to produce in the head the desired tool receiving recess.

The header die is the cylindrically shaped tool in which the cut-off portion of wire is retained during the successive blows of the upsetting operation. This die is often considered the most important header tool because it controls the finish, shape and dimensions of the headed blanks and its life is, indirectly, a measure of the overall efficiency of the header itself. The manufacture of header dies, in particular the finishing operations, has long been something of a problem to the cold heading industry and has become particularly acute in heading precision countersunk head screw blanks for aircraft fasteners from alloy steel, because of the accuracy required and the difficulty of cold forming the alloy material.

Usually these dies are produced from a good grade of heading die steel by first cutting off from bar stock of the size required, drilling, and then reaming, counterboring or otherwise machining to the approximate hole dimensions required. The dies are next heat treated and then must undergo further reaming, grinding, lapping or honing of the internal hole to the finished dimensions in the hardened stage. While under ideal circumstances, any of these methods may provide relatively smooth holes, inherently there will be minute annular unevenness or inaccuracies with respect to the hole. This condition occurs because of the necessity of rotating the die or the cutting tool, or both, in performing any of the conventional finishing operations such as reaming, grinding, etc. This roughness offers a serious problem on dies for aircraft parts which usually require extruding in the heading operations; that is, the wire diameter is reduced as it is pressed into the die when it meets the tapered portion commonly known as the extruding choke. Not only would such annular roughness, however minute, reduce die life by exposing high points only to wear but it would restrict the flow of metal in extruding and scrape the lubricant from the wire quickly leading to galling, chipping and ultimate die failure.

A primary object of the aforesaid co-pending application is the provision of a die in which the aforesaid minute annular inaccuracies are entirely absent, which die, therefore, has an increased useful life, during which the production of screw blanks of a higher quality is facilitated. A primary object of the present application is the provision of a suitable method for the manufacture of such dies.

More specifically, it is an object of the present invention to provide a method of making a cold header die comprising a hardened steel body having a central aperture for receiving the material to be headed, said aperture having a wall in which any irregularities extend longitudinally. A feature of such dies is or may be a shallow annular concavity which tends to prevent premature pulling out of the headed screw blanks by the recess-forming punch. Another object is the provision of a method of the character described, in which the aperture wall is compressed and work-hardened to a degree giving it a smooth, hard finish which not only facilitates performance of its function, but results in the production of a better quality of screw blanks.

Another object is the provision of a method of making header dies of the character described which method comprises the steps of preparing an unhardened die blank, supporting the die blank with one end and all lateral surfaces rigidly confined, and cold forming the die blank under heavy pressure with a hardened and polished hob having a configuration substantially complementary to the desired finished die, said hob having a body and a cylindrical projection, the latter penetrating the die blank in the forming step to produce a die aperture in which any irregularities of the walls extend longitudinally. A subsidiary object is the provision of such a method in which said forming is performed with sufficient pressure to cause annular elastic bulging of the hob projection, whereby a shallow annular concavity is formed in the wall of the die aperture.

Other and further objects, features and advantages will be apparent from the description which follows, read in connection with the accompanying drawings in which:

Figure 1 is an axial section of a conventional cold header die of the prior art;

Figure 2 is a greatly enlarged fragmentary sectional view corresponding to the portion A of Figure 1;

Figure 3 is a view partly in section and partly in elevation illustrating the beginning of the forming step of the method according to the present invention;

Figure 4 is a view similar to Figure 3 illustrating the furthest penetration of the hob into the die blank;

Figure 5 is an axial section of a finished die according to the invention;

Figure 6 is a greatly enlarged fragmentary view corresponding to the portion B of Figure 5;

Figure 7 is a fragmentary axial section illustrating the die of Figure 5 when in use in a cold heading machine;

Figure 8:
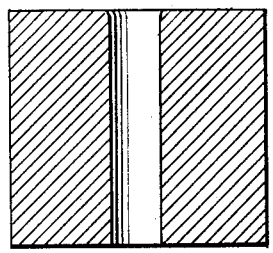
Figures 8, 9, 10 and 11 are axial sections illustrating other forms of header dies which may conveniently be produced by the method of the present invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

A typical header die of conventional form, as now in common use, is illustrated in Figures 1 and 2, the particular die shown being of the extrusion type. Such a die comprises a cylindrical body 10 of steel having a central aperture 11 extending therethrough. The aperture 11 comprises a cylindrical portion 12, which may be defined as a back hole or knock-out hole, a tapered portion 13, a short cylindrical portion 14 of smaller diameter than the portion 12, a short tapered portion 15, another cylindrical portion 16 of a diameter equal to the desired shank diameter of the finished screw, and a flaring countersunk portion 17. A die of the form illustrated in Figure 1 is employed in the manufacture of countersunk head screws, and is termed an extrusion die since the wire blank, upon being inserted from the front of the die (upper end in Figure 1) is, through a part of its length, forced past the constricted cylindrical portion 14, or extruding choke, reducing the diameter of that portion of the blank which is to be threaded. In other words, after a blank has been headed in a die of the type illustrated in Figure 1, the headed blank will conform to the configuration of the portions 17, 16, 15 and 14 of the die, but the portion of the blank which has penetrated beyond the extruding choke 14 will, of course, conform to that diameter throughout its length and, therefore, will not have the configuration of portions 12 and 13 of the die. The cylindrical portion 12 of the aperture accommodates the usual knockout pin for removing the headed blanks from the die after the completion of the heading operation on each blank.

Dies of the type illustrated in Figure 1 have heretofore been manufactured according to the technique described at the outset hereof, including the steps of drilling, reaming, counterboring, and heat treatment followed by further reaming and then by grinding, lapping or honing of the internal hole to the finished dimensions. As stated, this practice results necessarily in the formation of minute annular inaccuracies 18 which are shown in enlarged and somewhat exaggerated form in Figure 2, such annular inaccuracies 18 resulting in the disadvantages previously mentioned. Moreover, the involved and time-consuming operations heretofore necessary for the production of such dies greatly increases the cost thereof, many hours being required for the production of each die.

On the contrary, by the method of the present invention, a better die can be produced in a few minutes, resulting in a reduction in the production cost of the dies as well as providing dies which are better suited to the production of high quality screws and the like. According to the invention, there is first produced a hob 19 (Figure 3) having a cylindrical body 20 and a die-penetrating central projection comprising a cylindrical terminal portion 21 of reduced diameter, an intervening tapered portion 22, an intermediate cylindrical portion 23 of slightly larger diameter than that of the terminal portion 21, and a further tapered portion 24 joining the portion 23 and the body 20. The portions 21—24 are formed to produce portions 14, 15, 16 and 17 of the die as required. The hob is formed of hardened steel and is carefully machined and finished to exact dimensions and a mirror finish. A hob as described will serve in the production of a considerable number of dies.

In forming the die a length of bar stock of the required size is drilled to produce a blank 25 having a central aperture 26 of slightly smaller diameter than the projection 21 of the hob. The blank 25 is then rigidly confined below and laterally, by means of an anvil (not shown) and a chuck or receptacle 27, and the hob 19 is forced into the blank 25 under great pressure until it has penetrated to the desired extent, as shown in Figure 4. In the performance of this step, the surface of the metal surrounding the drilled aperture 26 of the die blank is compressed and work-hardened, giving it a superior finish and hardness. The hob is then withdrawn from the die blank, and the die is completed by grinding or otherwise machining the front or upper surface thereof to the required extent.

In carrying out the cold forming or hobbing step as described, it will be obvious that any minor irregularities which might possibly be formed in the internal surfaces of the die will extend longitudinally, rather than annularly, and will not, therefore, have any adverse effect upon the die or the screw blanks produced by its use. A further advantage of the present method resides in the fact that in some cases, for example in the production of an extruding die 30 such as illustrated in Figure 5 by the method described above and illustrated in Figures 3 and 4, the portion 23 of the hob, being of somewhat greater diameter than the portion 21 which itself is of larger diameter than the drilled hole 26, naturally encounters very great resistance in penetrating the die blank. As a result of such resistance, and the considerable pressure used in the process, the portion 23 of the hob is elastically deformed by the formation of a shallow annular bulge at its lower end, adjoining the tapered portion 22. This results in the formation of a corresponding shallow annular recess in the die 30, best illustrated in Figure 6, wherein the annular recess 31 is shown greatly enlarged and somewhat exaggerated. The presence of such shallow annular recess is of advantage in the heading of short header point screw blanks, such as that illustrated in the process of heading in Figure 7. There is a tendency for the recess forming punch to pull such short blanks out of the die upon retraction of the punch, thus causing the machine to malfunction, and the slight bulging of the screw blank into the shallow annular recess 31 of the die, during the heading operation, serves to reduce this tendency of the blanks to be pulled from the die by the recess forming punch.

Figure 9:
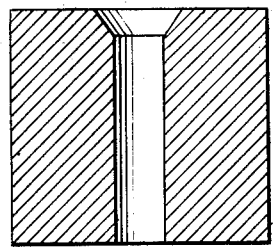
Figure 10:
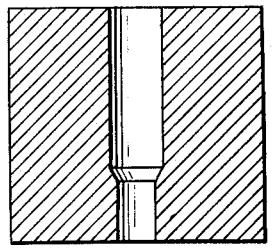
Figure 11:
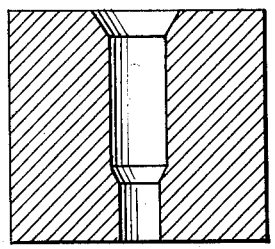

Figures 8 and 9 illustrate dies of the so-called straight hole type, Figure 8 showing a die adapted for the production of blanks of the protruding head type while Figure 9 relates to blanks of the countersunk head type. Figure 10 illustrates a die for forming header point blanks of the protruding head type while Figure 11 illustrates a similar die of the countersunk head variety. The dies of Figures 8–11 may be quickly and conveniently produced by the method outlined above. This type of die illustrated in Figures 10 and 11 produces headed blanks having a chamfered or tapered point serving as a lead to guide a threaded machine screw into ready engagement in a tapped hole or as a pilot for satisfactory use of tapping screws. Usually the diameter of the point of the blank is approximately 70% of the larger diameter, and the angle of the taper varies from approximately 42° to 15° depending on whether the screw blanks are to be chamfer pointed machine screws or tapping screws. It will be obvious that in hobbing this type of die, the diameter of the hole initially drilled in the blank must approximate the smaller diameter of the finished screw blank whereas the diameter of the portion 21 of the hob will be that of the main portion of the shank of the screw blank. Because of the wide difference in these two diameters, requiring drastic material displacement, there is a definite limit in the distance which the hob can be pressed into the die blank, usually about 4 times the diameter of the portion 21 of the hob, and in the resulting length of the headed screw blank produced. This limitation is not a serious one, as there are certain other factors inherent in the cold heading operation which limit the length of header point blanks which can be produced.

Figure 12:
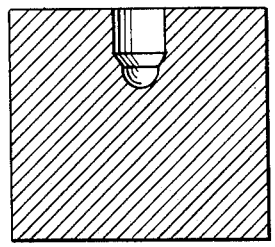
Figure 12 is an axial section illustrating a die blank after completion of the forming step according to the invention.
Figure 13:
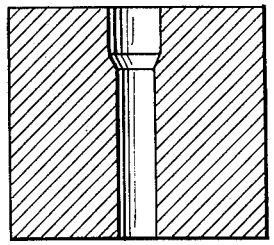
Figure 13 is a similar view showing the die blank of Figure 12 after completion of a further step in the production of a die.

It has been found possible to hob dies for very short header point screw blanks from a solid die blank, such as that seen in Figure 12. After hobbing, such dies are drilled through to a diameter somewhat smaller than the final point diameter following which this smaller hole can be hobbed in the maner described for the straight hole dies to produce a finished die such as seen in Figure 13. Such secondary hobbing, however, is not essential since a drilled hole will adequately accommodate the knock-out pin of the heading machine.

Figure 15:
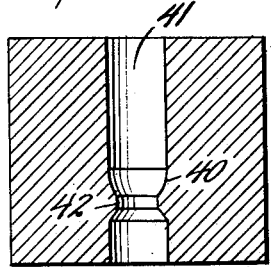
Figure 15 is an axial section of a still further form of die produced according to the invention.
Figure 16:
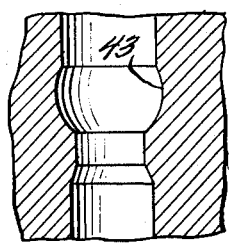
Figure 16 is an enlarged fragmentary view corresponding to Figure 15.
Figure 14:
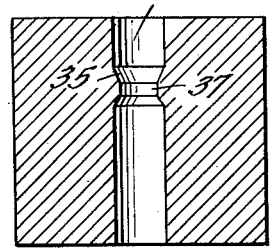
Figure 14 is a similar view illustrating another form of die.

Figures 14, 15 and 16 illustrate dies of the extrusion type, formed according to the present invention. The die of Figure 14 has been formed with the usual tapered portion 35 joining the straight portion 36 with the constricted extrusion choke 37, whereas the die of Figure 15 is formed to provide a connecting portion 40 of different form between the straight portion 41 and the extrusion choke 42. The portion 40 is provided with an inwardly concave longitudinal curvature, which possesses certain advantages in the case of extrusion dies. There is also the possibility of such a corresponding rounded or convex shape being required in the finished screw, and one of the advantages of the present method of producing header dies lies in the possibility of producing screw blanks of such shape. No other method is known whereby this internally curved condition may be produced in a header die, with a satisfactory finish, by the conventional methods. As illustrated in Figure 16, if the diameter of the shank portion of the die aperture is sufficiently larger than that of the extruding choke, the resultant bulging of the portion 23 of the die forming hob will cause a corresponding annular concavity in the die which, in this case, will merge with the concavity of the portion 40 as designed into the die to produce the concavity 43 of Figure 16.

In all of the cases described above, the advantages of economy, speed of production, accuracy, superior finish, longitudinal lay of the finish, and prevention of blank pullout, are inherent. In the case of extruding dies, however, which are used principally to head alloy steel blanks for aircraft screws, it has been found virtually impossible to produce header dies from the proper grade of tool steel by the conventional methods, with the result that dies used in this type of heading operation gave a relatively unsatisfactory performance and were of very short useful life. Dies made according to the present invention, on the other hand, not only perform more satisfactorily and last much longer in this service, but produce better screw blanks of the extruded type because the direction of the die finish is longitudinal, eliminating the defects caused by the annular finishing marks of dies produced by the conventional methods.

Having thus described the invention, what is claimed as new and desired to be secured by Letters Patent is:

1. Method of making header dies of cold heading machines comprising preparing an unhardened die blank, supporting said die blank with one end and all lateral surfaces rigidly confined, and cold forming said die blank under heavy pressure with a hardened and polished hob having a configuration substantially complementary to the desired finished die, said hob having a body and a die-penetrating projection, the latter penetrating the die blank in the forming step to produce a die aperture in which any irregularities of the walls extend longitudinally, said hob projection having a reduced terminal portion end, said forming being done with sufficient pressure to cause annular elastic bulging of said hob projection at a point near said terminal portion, withdrawing said hob, finishing the other end of said die blank, and hardening said blank.

2. In the method of claim 1, the step of pre-drilling the die blank to produce an aperture of slightly smaller diameter than the desired finished diameter of the die aperture.

3. In the method of claim 1, the step of pre-drilling the die blank to produce a through aperture of slightly smaller diameter than the desired finished diameter of the die aperture.

4. In the method of claim 1, the step of drilling the formed die blank from the end opposite to that penetrated by said projection, to connect with said aperture.

5. Method of making header dies of cold heading machines, comprising preparing a centrally bored, unhardened die blank, supporting said blank with one end and all lateral surfaces rigidly confined, and cold forming said die blank with a hardened and polished hob having a configuration substantially complementary to the desired finished die, said hob having a body and a central projection extending into the bore of said die blank, said projection including an enlarged portion adjacent said body, having a transverse section of substantially greater diameter than said central bore, a reduced terminal portion having a transverse section of slightly greater diameter than said central bore, and an intermediate portion connecting said other portions, said forming being done with sufficient force to cause elastic bulging of said hob projection in the region of said enlarged portion adjacent its junction with said intermediate portion, withdrawing said hob, finishing the other end of said die blank, and hardening said blank.

6. Method of making header dies of cold heading machines, comprising preparing a centrally bored, unhardened die blank, supporting said blank with one end and all lateral surfaces rigidly confined, and cold forming said die blank with a hardened and polished hob having a configuration substantially complementary to the desired finished die, said hob having a body and a central projection, the latter penetrating the die blank in the forming step to produce a die aperture in which any irregularities of the walls extend longitudinally, said projection including an enlarged cylindrical portion adjacent said body, having a transverse section of substantially greater diameter than said central bore, a reduced cylindrical terminal portion having a transverse section of slightly greater diameter than said central bore, and a frustoconical intermediate portion connecting said other portions, said forming being done with sufficient force to cause permanent deformation of said die blank into the desired shape and compression and hardening of the surfaces contacting said hob, withdrawing said hob, finishing the other end of said die blank, and hardening said blank.

References Cited in the file of this patent

UNITED STATES PATENTS

| 2,014,698 | Reilly | Sept. 17, 1935 |
| 2,066,372 | Tomalis | Jan. 5, 1937 |
| 2,618,989 | Cupler | Nov. 25, 1952 |
| 2,638,019 | Stellin | May 12, 1953 |
| 2,699,693 | Stellin | Jan. 18, 1955 |